(No Model.)
R. FAWCETT.
AXLE NUT.
No. 528,293. Patented Oct. 30, 1894.
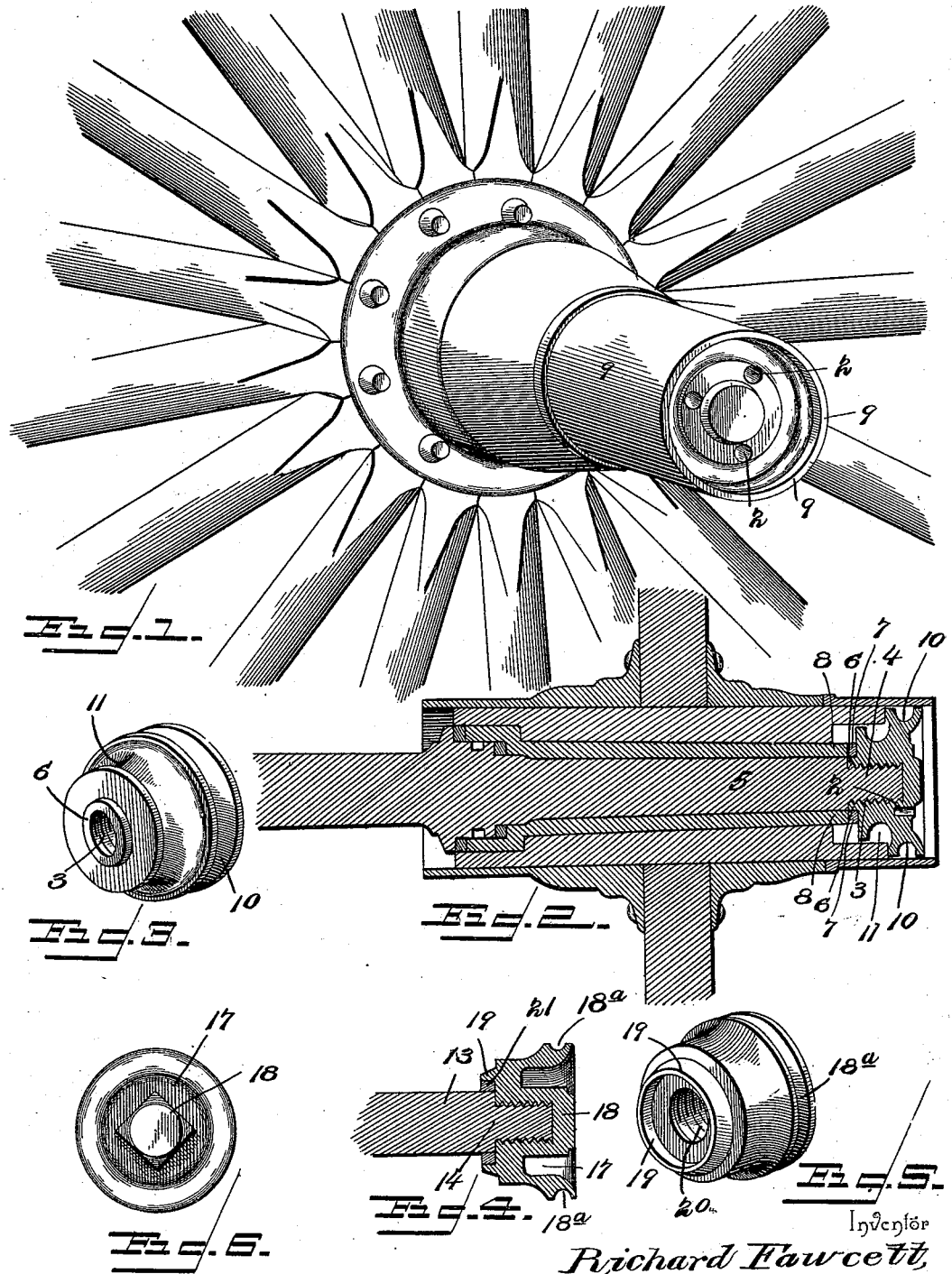
Inventor
Richard Fawcett
Witnesses
E. K. Stewart
W. S. Duvall
By his Attorneys,
C. A. Snow & Co.

UNITED STATES PATENT OFFICE.

RICHARD FAWCETT, OF SALEM, OHIO.

AXLE-NUT.

SPECIFICATION forming part of Letters Patent No. 528,293, dated October 30, 1894.

Application filed June 28, 1893. Serial No. 479,081. (No model.)

*To all whom it may concern:*

Be it known that I, RICHARD FAWCETT, a citizen of the United States, residing at Salem, in the county of Columbiana and State of Ohio, have invented a new and useful Axle-Nut, of which the following is a specification.

My invention relates to improvements in axle nuts.

Heretofore nuts of this class have been constructed with an outer or external angular surface to provide for the reception of a wrench and have had formed at their inner sides enlarged disk portions, which approximated the internal diameters of the hub-bands of the wheel. Of necessity a space intervened between the edge of the disk and the hub-band so as to permit of a free rotation of said band about the nut. This space permitted grit such as sand and dust to work its way through the same and hence gain access to the spindle portions of the axle, much to the detriment of the latter and the axle skein.

The objects of my invention are to avoid so far as possible the access or admission of dust, grit and other foreign bodies to these vulnerable portions of the wheel; and furthermore to so construct the nut as to lend a more finished appearance to the wheel as a whole; and finally to prevent the escape through the hub of exhausted or used up oil.

With these and other objects in view the invention consists in certain features of construction hereinafter specified and particularly pointed out in the claims.

Referring to the drawings:—Figure 1 is a perspective view of a portion of a wheel and axle, the same being provided with a nut embodying my invention. Fig. 2 is a longitudinal sectional view of Fig. 1. Fig. 3 is a detail in perspective of the nut. Fig. 4 is a longitudinal sectional view illustrating a modified construction of nut. Fig. 5 is a perspective view of said modified construction of nut. Fig. 6 is a front elevation of said nut.

Like numerals indicate like parts in the several figures of the drawings.

In manufacturing the preferred form or construction of nut I employ the annular nut body 1, giving the same any outer facial contour or design desired. In the present instance and in the preferred form countersunk openings 2, are provided around the center of the nut the same being designed to accommodate the prongs of a suitable wrench. The rear face of the nut is provided with a socket or bore 3, which is internally threaded to receive the spindle 4, of the axle 5. This socket is surrounded by a superficial bead 6, which may be surmounted by a leather washer 7, interposed between the inner face of the nut and the end of the hub 8.

Externally considered the nut is of such diameter as to approximate the internal diameter of the hub-band 9, that is the outer end of said nut is thus proportioned, and surrounding the same adjacent to said outer end is an annular groove 10. The rear or inner half of the nut is preferably of not so great a diameter, but like the outer half is likewise provided with an annular groove 11.

It will be seen that the nut in depth agrees with the depth of the recess formed by the outer end of the hub and the surrounding hub-band, so that said recess or cavity is completely filled forming no space for lodgment of grit, &c., but shedding all such as may be thrown there-against or the face of the nut during the revolution of the wheel. The oil that has been used or that may be superfluous to a lubrication of the bearing, and which usually escapes around the nut and is discharged from the hub-band, is arrested and prevented from such discharge, and instead of being so discharged is caught and carried by the annular grooves mentioned. If perchance any dust or grit should work its way between the hub-band and nut it like the oil, will also be caught and carried by said grooves.

Thus it will be seen that I have provided a nut which lends greatly to the finished appearance of the wheel as a whole; which also prevents the escape of the lubricant and the discoloration or staining of the running gear; and finally, prevents access of said grit to the vulnerable or bearing portions of the wheel and axle.

Various changes may be made in the details of my invention without departing from the spirit thereof and which I consider as being within the knowledge of the skilled mechanic. For the purpose therefore of illustrating such change, reference is had to Figs. 4 and 5 of the drawings, wherein 13 designates the axle, 14 the bearing, 15 the hub, and 16 the hub-band. The change in this instance consists principally in producing an annular groove in the outer face of the nut, which groove is indicated as 17. By such production I leave at the center of the nut a sunken boss 18, which resembles the exterior of a nut and in fact serves the purpose of such in that it is provided with polygonal faces to accommodate the jaws of a wrench by which the nut as an entirety may be removed or applied. The exterior of this nut may have one or more oil grooves $18^a$, and its inner face is provided with the superficial annular bead 19, that surrounds the threaded socket 20, of the nut. In this annular bead is located the leather washer 21, the whole combining and operating in the same manner and with the same advantages as the construction heretofore described though as will be obvious its peculiarity of construction renders it of less weight.

Having described my invention, what I claim is—

1. The herein described axle nut made of a single piece of metal of such a size and shape as to approximate the internal diameter and depth of a wheel hub-band, and completely fill the interior recess formed thereby, and provided with a threaded socket or bore extending partly therethrough from its inner side, and also having an annular open groove in its periphery, said groove being closed by the hub-band when the nut is in position, the outer face of the nut being then disposed within the outer edge of the hub-band, substantially as described.

2. The herein described nut, the same being of such diameter as to approximate that of the hub-band, said nut having its inner portion of less diameter than its outer and each provided with an annular oil groove, substantially as specified.

3. The herein-described axle-nut, the same having such shape and size as to approximate the internal diameter and depth of the hub-band and completely filling the recess or cavity formed by the latter, the outer face of the nut having an annular groove 17 forming a central boss 18 with a polygonal face, the boss being arranged flush with the said outer face, substantially as described.

In testimony that I claim the foregoing as my own I have hereto affixed my signature in the presence of two witnesses.

RICHARD FAWCETT.

Witnesses:
 GEO. STREET,
 E. F. RUKENBROD.